United States Patent [19]

Behringer et al.

[11] Patent Number: 4,523,720

[45] Date of Patent: Jun. 18, 1985

[54] FOOD PROCESSOR ASSEMBLY

[75] Inventors: John Behringer, Wickford, R.I.; Pierre Martin, Paris, France

[73] Assignee: Robot-Coupe, S.A., Bagnolet, France

[21] Appl. No.: 613,003

[22] Filed: May 21, 1984

Related U.S. Application Data

[63] Continuation of Ser. No. 339,377, Jan. 15, 1982, abandoned.

[51] Int. Cl.³ .............................................. B02C 18/12
[52] U.S. Cl. ..................................... 241/37.5; 241/92; 241/282.1
[58] Field of Search ...................... 241/37.5, 92, 282.1, 241/282.2, 285 R, 285 A

[56] References Cited

U.S. PATENT DOCUMENTS

| | | |
|---|---|---|
| 1,157,013 | 10/1915 | Lewis ...................................... 241/92 |
| 2,414,075 | 1/1947 | Walker . |
| 2,590,909 | 4/1952 | Westby et al. ..................... 241/92 X |
| 2,796,103 | 6/1957 | Feinstein . |
| 3,892,365 | 7/1975 | Verdun ................................. 241/92 |
| 4,185,788 | 1/1980 | Durling ........................... 241/285 A |
| 4,226,373 | 10/1980 | Williams ............................ 241/37.5 |

FOREIGN PATENT DOCUMENTS 1206134  2/1960  France .

Primary Examiner—Mark Rosenbaum
Attorney, Agent, or Firm—Dewey, Ballantine, Bushby, Palmer & Wood

[57] ABSTRACT

An assembly for use with a food processor and adapted to permit processing of large food items, the assembly including a tubular member mountable on the open end of the processor bowl and provided with an inwardly directed wall terminating in a boss.

17 Claims, 3 Drawing Figures

FOOD PROCESSOR ASSEMBLY

This application is a continuation of U.S. application Ser. No. 339,377, filed Jan. 15, 1982, now abandoned.

BACKGROUND OF THE INVENTION

This invention pertains to food processors and, in particular, to an assembly for use with such processors to enable same to handle large food items with maximum safety and ease.

Food processors in use in the home today generally employ a base which supports a bowl for receiving the shredded, sliced or otherwise cut food items. A drive shaft extends upwardly from the base and passes through a hole in the bottom of the bowl. Mounted on the upper end of the drive shaft is a cutting assembly which carries a blade. The blade, in turn, is situated on the raised edge of a radially extending slot of a circular disc. Food items are fed to the blade via a feed tube which extends upwardly from a cover which locks to and closes the upper end of the bowl. A removable pusher is utilized to urge the food items through the feed tube to the blade.

In processors of the above type, the user is usually protected from coming in contact with the blade by providing an actuator on the cover which is adapted to actuate a motor-enabling-switch-assembly only when the cover is properly in place and locked on the bowl. The use of such an actuator, however, still does not prevent the user from contacting the blade via the feed tube. As a result, the feed tube has also been adapted to protect the user by limiting its size. This, in turn, has limited the size of the food items which can be processed.

Various attempts have been made at further adapting home food processors to handle large food items. One arrangement utilizes a feed tube adapter which slides over the feed tube and is used in conjunction with a captured pusher. In this arrangement, the actuator for the motor-enabling-switch-assembly is carried by the feed tube adapter and only when the cover is locked in place on the bowl and the adapter is mounted on the feed tube is the processor motor enabled. This construction, however, has been found to be less than entirely satisfactory.

Another approach utilized in commercial food processors, as distinguished from the above-described home food processors, utilizes a hopper assembly mounted above the processor blade and provided with slits for receiving walls. These walls extend radially inwardly to a maximum point which is short of the centerline of the hopper. As a result, the hopper is segmented by the walls into sectors which are open radially and from above and can be made of increased size to handle large food items.

With this hopper assembly, the processor blade is of special construction so as to avoid cutting near the open central area of the hopper. Furthermore, to prevent cut food from entering this open area, a further attachment in the form of a rod is provided and is mounted on the drive shaft so as to extend into the open area, thereby reducing same.

The pusher of the hopper assembly includes slots for allowing passage of same into the hopper sectors between the walls. Also, the pusher is piston operated and cooperates with a switch which enables the processor motor to operate only after the pusher has been brought to a position where it overlaps at least a 180° area of the hopper opening.

While the aforesaid hopper assembly enables large food items to be processed, it requires a specially adapted blade and a hopper with a plurality of sectors resulting from a plurality of walls. The assembly, therefore, is not readily usable as an attachment for the previously discussed processors used in the home.

It therefore is an object of the present invention to provide an assembly for enabling safe processing of large food items in home processors of the above-mentioned type.

SUMMARY OF INVENTION

In accordance with the principles of the present invention, the above and other objectives are realized in an assembly for use with home processors wherein the assembly comprises a tubular member adapted to be mounted to the upper end of a processor bowl and carrying a wall extending inwardly from the inner surface of the tubular member, the wall terminating in a boss. The boss extends outwardly to a point which is at or beyond the radially innermost edge of the processor blade, while the inner surface of the tubular member above the blade is inward of the radially outermost edge of the blade. The upper end of the tubular member is closed by a cover which includes an actuator for actuating a motor-enabling-switch-assembly. An opening in the cover guides a tubular shaft having a disc attached to the lower shaft end for urging the food to be processed toward the blade. A slot in the disc and a slot in the tubular shaft along with the shaft bore enable passage of the pusher over the boss and wall.

With the aforesaid assembly, food items can be processed having a radial dimension equal to the radial distance between the boss and the inner surface of the tubular member above the blade, this dimension being significantly larger than the dimension in previous processors utilizing standard feed tubes. Also, the processing of such large food items can be safely carried out as the processor motor is enabled only after the food items are placed in the tubular member and the member is closed by the cover. The assembly thus offers a relatively simple and safe construction for large food items and is completely adaptable to present processors for home use.

BRIEF DESCRIPTION OF THE DRAWINGS

The above and other features and aspects of the present invention will become more apparent upon reading the following detailed description in conjunction with the attached drawings, in which.

DETAILED DESCRIPTION

Figure 1:
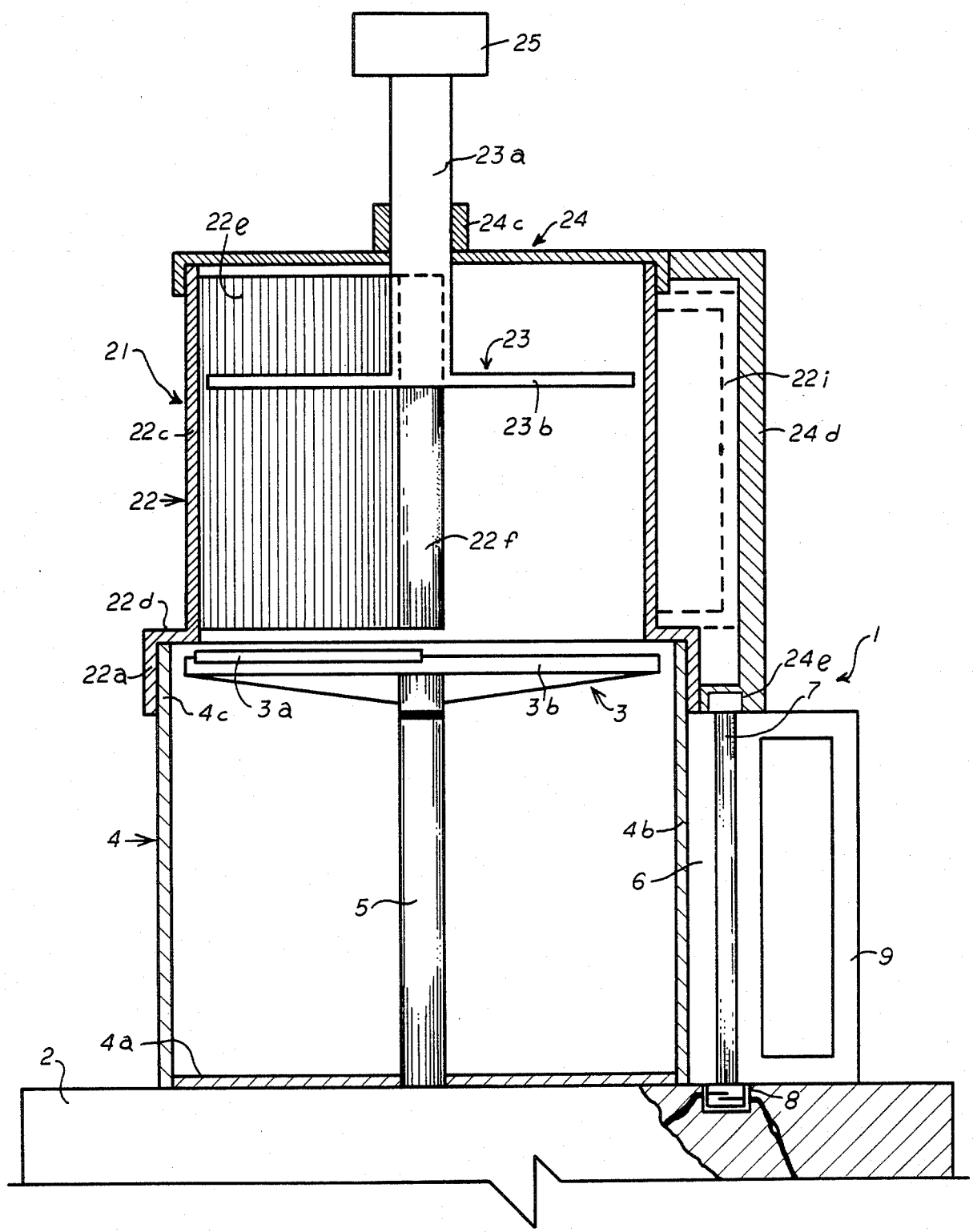
FIG. 1 shows a sectional view of a food processor incorporating an assembly in accordance with the principles of the present invention.
Figure 2:
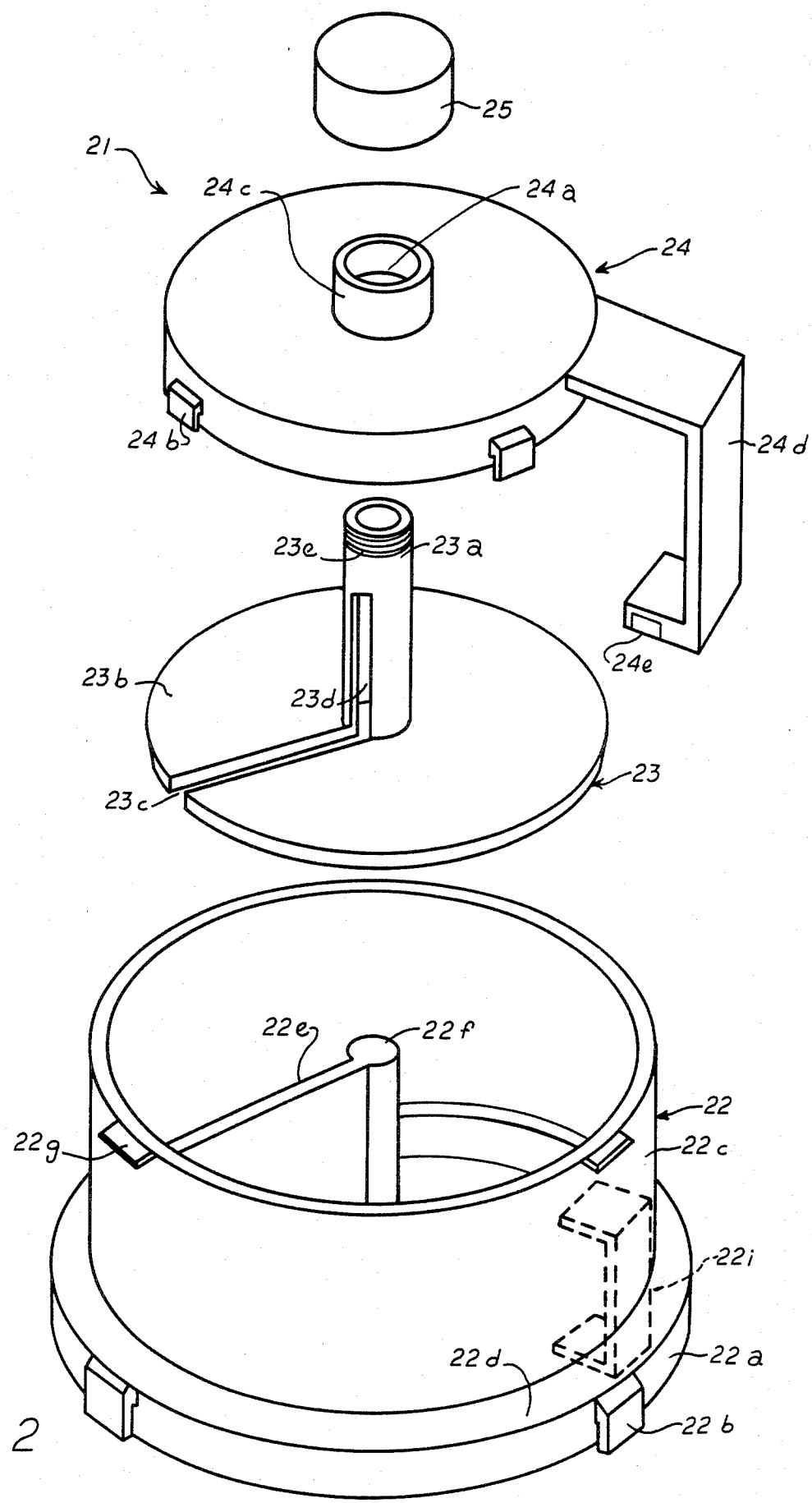
FIG. 2 illustrates an exploded view of an assembly in accordance with the principles of the present invention.

In FIG. 1, a food processor 1 includes a base 2 in which is housed a motor (not shown) for operating the processor. Removably mounted on the base 2 is a bowl 4 which receives food items which are sliced by a cutting disc 3a supported in a frame 3b of a cutting assembly 3, the assembly 3 being situated at the upper end of the bowl 4.

The assembly 3 is mounted to a drive shaft 5 which extends upwardly from the base 2 through the bottom 4a of the bowl 4. A duct 6 located on sidewall 4b of the bowl 4 carries a rod 7 of ferromagnetic material such as soft iron or ferrite. The rod 7 when magnetically polarized transmits this polarization to a magnetic contact or switch 8 closing same. The switch 8, in turn, is connected in the supply circuit of the motor of the processor and when closed permits operation of the motor and, therefore, the processor.

A handle 9 extends outwardly from the duct 7 and facilities removal of the bowl from the base 2.

In accordance with the invention, the processor 1 is further provided with an assembly 21 which is adapted to permit the safe processing of large food items. More particularly, a tubular member 22 is mounted on the upper open end 4c of the bowl 4 so as to extend above the cutting blade 3a. The member 22 includes a lower skirt section 22a which fits over the bowl upper end 4c and is provided with lugs 22b for engaging corresponding locking tabs (not shown) on the bowl 4 for rotational locking engagement in usual fashion.

Above the skirt section 22a, is an upper section 22c. This section, above the disc 3a, is inward of the radially outermost edge 3d of the cutting blade 3c carried on the raised edge of the arcuate cutting slot 3e of the disc. In the case shown, this occurs via a step 22d between the upper end of skirt 22a and the lower end of section 22c.

An inner flat wall or baffle 22e extends radially inwardly of the inner surface of the upper section 22c and ends in a centrally located enlarged boss 22f. Boss 22f is concentric with the shaft 5 and disc 3a and extends radially outward to a point which is beyond the innermost edge 3f of the blade 3c.

As can be appreciated, the distance between the outer surface of the boss 22f and the inner surface of the upper section 22c above the disc 3a defines the radial dimension of the food items which can be placed in the member 22 for cutting by blade 3c. This dimension is slightly less than the radial dimension of the bowl 4 and, therefore, is considerably larger than the maximum dimension of conventional feed tubes. As a result, considerably larger food items can be processed with the assembly 21. Furthermore, this can be realized safely and with reliable cutting action, as will be discussed in greater detail hereinbelow.

A food pusher 23 includes a hollow shaft 23a whose inner surface conforms to that of the outer surface of boss 22f. A flat disc 23b is mounted to the shaft 23a and extends radially outward to a point approaching the radial extent of the upper section 22c. A radial slot 23c and a longitudinal slot 23d in the disc and shaft permit these members to slid downwardly over the flat section of wall 22e. The slot 23d in turn, is of length which stops the downward movement of the disc 23b at a point above the blade 3c.

The shaft 23a extends upwardly through an aperture 24a in a cover 24 which is provided with lugs 24b for permiting rotational locking engagement of the cover over the open upper end of section 22c via tabs 22g. A collar 24c provides a guide for the shaft 23a whose upper end 23e is threaded and receives a removable cap 25.

An actuator 24d is carried by the cover 24 and houses a magnet 24e at its lower end. The actuator is in the form of a handle and extends the length of the tubular member 22 to a point where its lower end seats on the top of the duct 7 when the cover 24 is locked in place on member 22 and the member 22 is locked in place on the bowl 4. Only when this occurs will the switch 8 thus be actuated via rod 7 rendering the processor motor enabled.

In operation of the assembly 21, the tubular member 22 is first mounted on the bowl 4 and rotationally locked in place. Food items of large size can then be inserted into the upper section 22 starting at the face 22h of wall 22e which is the trailing face as the disc rotates in the direction indicated. With the present assembly, more than one item of maximum radial dimension can be placed in the member 22 so that not only is the size of the individual items increased, but the capacity per operation of the processor is also increased.

Once the items are placed in the member 22, the cover carrying the pusher is then mounted on and rotationally locked to the upper end of the section 22c. Only at this time is the magnet 24e brought into engagement with the magnetic rod 7 via the actuator 24d. The rod 7, in turn, couples magnetic flux to the switch 8 closing same and thereby permtting operation of the processor. The user is thus fully protected by the cover 24c from the cutting blade 3c during processor operation, while at the same time large items are able to be processed.

Figure 3:
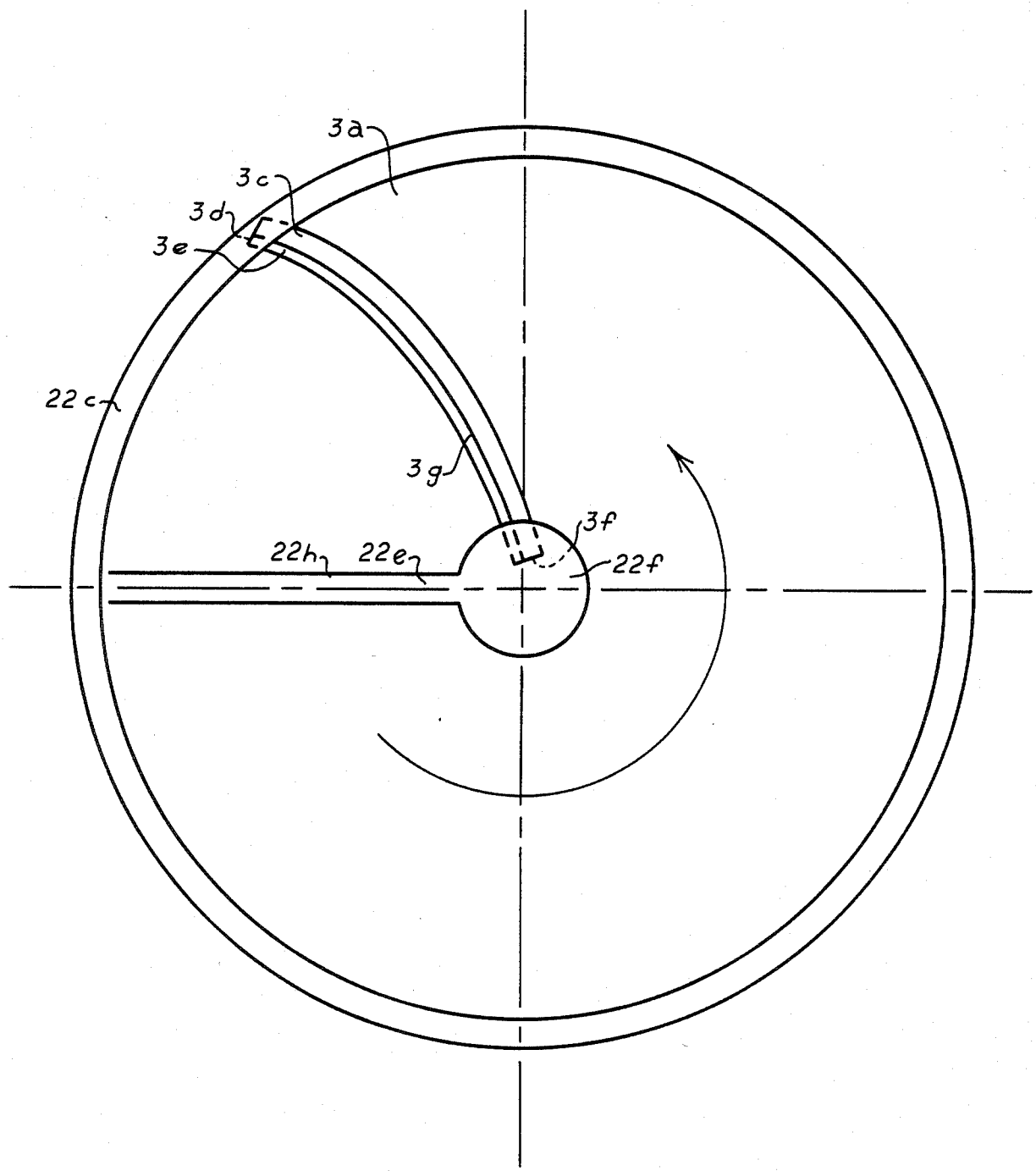
FIG. 3 is a top view looking down from the opening of the assembly onto the processor blade.

Once the processor is enabled and the blade 3c rotates, the wall 22e acts to hold the food items and prevent them from moving. The boss 22f, in turn, due to its curved configuration cooperates with the wall to maintain the food items in place by urging the items toward the wall. Furthermore, the radial outward extent of the boss outer surface and the radial extent of the upper section inner surface, as above-described, prohibit the existence of accessible food areas which would not be subject to the cutting edge 3g of the blade 3c and, thus, would result in tearing and other improper cutting action. This can be seen in FIG. 3, where the overlap of the boss 22f with the innermost edge 3f of blade 3c prohibits food from being placed radially inward of the path traveled by this edge. Similarly, the overlap of the inner surface of section 22c and the outermost blade edge 3d, prohibits placing of food in an area radially outward of the path traveled by such outermost edge 3d.

The assembly 21 thus permits large food items to be processed by the processor 1 safely and with the desired cutting action.

In a modification of the assembly 21, the tubular member 22 can be further provided with a handle 22i shown in dotted line which facilitates mounting the member on the base 4. The handle 22i can be further situated to nest with the handle 24d of the cover so as to permit removal of both members jointly, as shown in FIG. 1.

In all cases, it is understood that the abovedescribed arrangements are merely illustrative of the many possible specific embodiments which represent applications of the present invention. Numerous and various other arrangements can readily be devised in accordance with the principles of the present invention without departing from the spirit and scope of the invention. Thus, for example, instead of a magnetic actuator on the bowl and cover, mechanical actuators could be employed. Furthermore, the surface of boss 22f can be of various shapes as long the shape defines a curved path in the direction of the path of the blade 3c. Additionally, the wall 22e can be made integral with the tubular section 22c as well as detachable therefrom.

What we claim is:

1. A food processor comprising:
   a base;
   a motor housed in said base;
   a drive shaft extending upwardly from said base and drivable by said motor;
   a bowl supportable on said base;
   a cutting tool housed in said bowl, mountable on said drive shaft, and including a cutting blade having radially outermost and innermost edges; and
   a tubular member mountable on said bowl such that an inner surface of said tubular member overlies a path swept out by the outermost edge of said cutting blade when said cutting tool is mounted on said drive shaft and said drive shaft is driven by said motor, said tubular member having a vertical boss situated substantially at the center of said tubular member such that an outer surface of said boss overlies a path swept out by the innermost edge of said cutting blade when said cutting tool is mounted on said drive shaft and said drive shaft is driven by said motor, and said tubular member further having a vertical wall extending from the inner surface of said tubular member to the outer surface of said boss.

2. A food processor in accordance with claim 1 further comprising:
   a food pusher including: a disc having a slot extending from the disc periphery inwardly; and a hollow shaft extending upwardly from the disc and having a longitudinal slot which extends upwardly from said radial slot, said radial and longitudinal slots and the hollow interior of said shaft being adapted to receive said wall and boss as said pusher is introduced into said tubular member;
   and a cover mountable on said tubular member, said cover having an aperture through which said hollow shaft passes.

3. A food processor in accordance with claim 2 wherein said food processor includes a motor-switch-enabling-assembly and wherein:
   said cover includes: an actuator for actuating said switch-enabling-assembly, said actuator having the form of a handle and extending to the lower end of said tubular member.

4. A food processor in accordance with claim 3 wherein:
   said tubular member includes a further handle and said further handle nests with said cover handle when said cover handle is in position to engage said switch-enabling-assembly.

5. A food processor in accordance with claim 3 wherein:
   said tubular member includes: means for lockingly engaging said bowl;
   said cover includes means for lockingly engaging said tubular member; and
   said actuator is positioned so that said actuator engages said motor-switch-enabling-assembly only when said tubular member is locked to said bowl and said cover is locked to said tubular member.

6. For use with a food processor comprising a base, a motor housed in the base, a drive shaft extending upwardly from the base and drivable by the motor, a bowl supportable on the base, a cutting tool housed in the bowl, mountable on the drive shaft, and including a cutting blade having radially outermost and innermost edges, an assembly comprising:
   a tubular member mountable on the bowl such that an inner surface of said tubular member overlies a path swept out by the outermost edge of the cutting blade when the cutting tool is mounted on the drive shaft and the drive shaft is driven by the motor, said tubular member having a vertical boss situated substantially at the center of said tubular member such that an outer surface of said boss overlies a path swept out by the innermost edge of the cutting blade when the cutting tool is mounted on the drive shaft and the drive shaft is driven by the motor, and said tubular member further having a vertical wall extending from the inner surface of said tubular member to the outer surface of said boss.

7. An assembly in accordance with claim 6 further comprising:
   a food pusher including: a disc having a slot extending from the disc periphery inwardly; and a hollow shaft extending upwardly from the disc and having a longitudinal slot which extends upwardly from said radial slot, said radial and longitudinal slots and the hollow interior of said shaft being adapted to receive said wall and boss as said pusher is introduced into said tubular member.

8. An assembly in accordance with claim 7 wherein:
   said longitudinal slot extends to a point which is less than the length of said wall, whereby the travel of said pusher is limited to prevent said pusher from engaging said blade when said cutting tool is mounted on said shaft.

9. An assembly in accordance with claim 7 further comprising:
   a cover mountable on said tubular member, said cover having an aperture through which said hollow shaft passes.

10. An assembly in accordance with claim 9 wherein:
    said pusher further includes: a removably mounted cap disposed on the upper end of said hollow shaft above said aperture.

11. An assembly in accordance with claim 9 wherein said food processor includes a motor-switch-enabling-assembly and wherein:
    said cover includes: an actuator for actuating said switch-enabling-assembly.

12. An assembly in accordance with claim 11 wherein:
    said actuator is in the form of a handle.

13. An assembly in accordance with claim 12 wherein:
    said tubular member includes a further handle.

14. An assembly in accordance with claim 13 wherein:
    said further handle nests with said cover handle when said cover handle is in position to engage said switch-enabling-assembly.

15. An assembly in accordance with claim 11 wherein:
    said actuator extends to the lower end of said tubular member.

16. An assembly in accordance with claim 11 wherein:
    said tubular member includes: means for lockingly engaging said bowl; and
    said cover includes means for lockingly engaging said tubular member.

17. An assembly in accordance with claim 16 wherein:
    said actuator is positioned so that said actuator engages said motor-switch-enabling-assembly only when said tubular member is locked to said bowl and said cover is locked to said tubular member.

* * * * *